B. Webb,
Saw-Mill Head-Block.
Nº 3,577. Patented May 6, 1844.
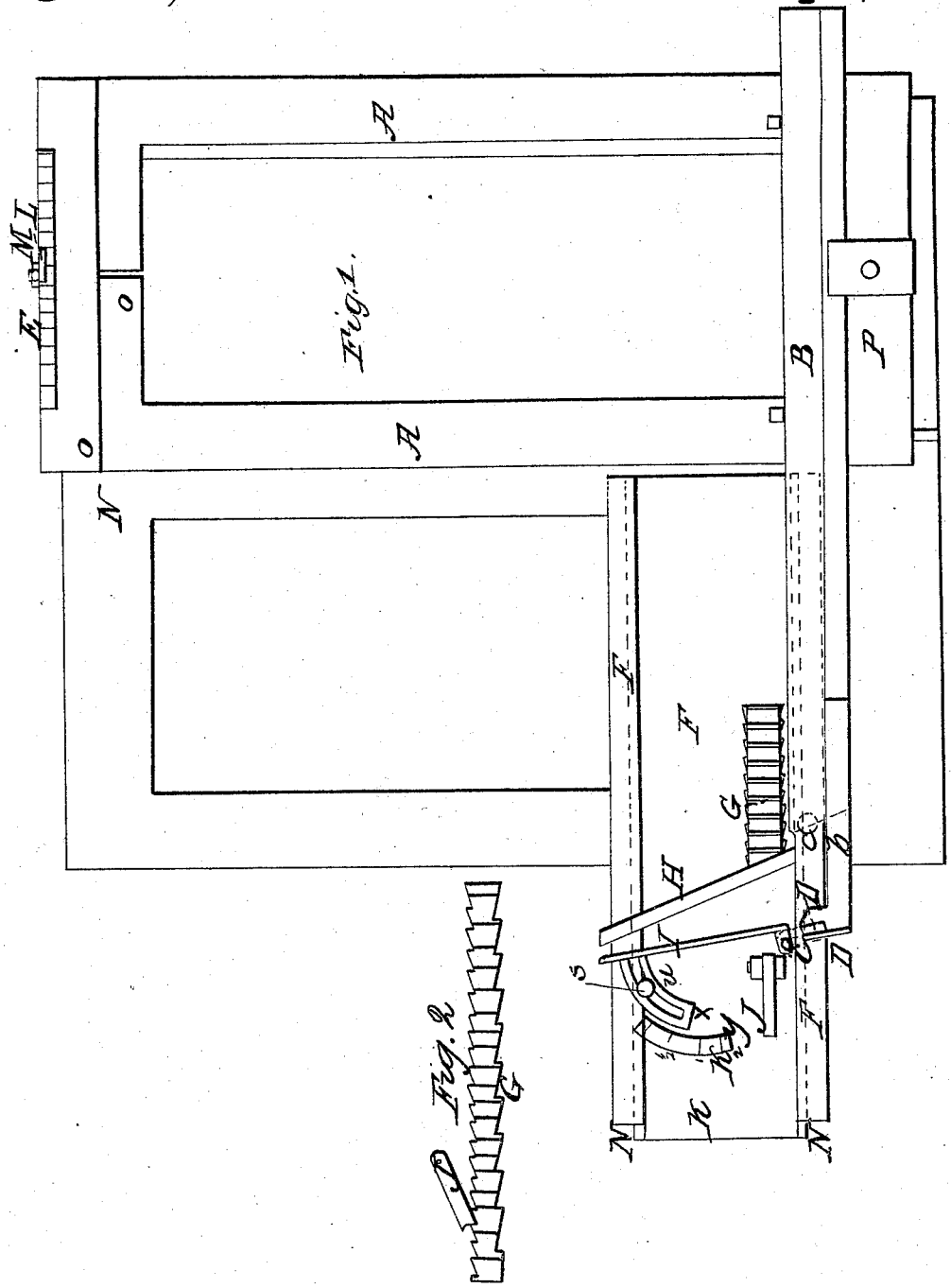

UNITED STATES PATENT OFFICE.

BENJN. WEBB, OF WARREN, NEW YORK.

SELF-SETTING APPARATUS FOR SETTING LOGS ON SAWMILL-CARRIAGES.

Specification of Letters Patent No. 3,577, dated May 6, 1844.

*To all whom it may concern:*

Be it known that I, BENJAMIN WEBB, of Warren, in the county of Herkimer and State of New York, have invented a new and useful improvement in sawmills for sawing boards, being an apparatus to be applied to the carriage and frame of sawmills by which the log to be sawed into boards is set toward the saw every time the carriage is jigged back and for any thickness of boards required, called "Webb's self-setting apparatus for sawmills," which is described as follows, reference being had to the annexed drawings of the same, making part of this specification, of which—

Figure 1 is a plan showing the apparatus as applied to the tail block of a sawmill, also the carriage and part of the frame of the mill. Fig. 2 the rack and pall.

The nature of this invention and improvement consists in having a slide containing two bevels or inclined guides—one fixed and the other adjustable—the latter serving as a gage placed opposite the head or tail block on ways at right angles to the frame said slide and bevels being brought or set toward the head or tail block as the carriage moves toward the saw by means of an arm and latch attached to the slide of the tail block carrying one end of the log—the latch on said arm striking the adjustable bevel or gage which causes the slide to move toward the carriage the distance of the required set in which position said slide is held and prevented from moving back by a pall attached to the slide which drops into a rack placed on the frame. When the carriage is jigged back the end of the aforesaid slide of the tail block strikes the inner or fixed bevel which causes the said tail block-slide to move on the tail block carrying with said slide the end of the log resting thereon to an extent equal to the thickness of the required board to be sawed. The slide of the head block carrying the other end of the log may be moved by a lever, hand and rack—the lever being represented at M the hand at L and the rack at E.

The frame N carriage A—head block o—tail block P—and slide B—may be made in the usual manner.

The parallel ways or frame F F in which the slide K carrying the gage I and bevel H moves are secured to the main frame N at right angles thereto. These ways are grooved on their inner sides to admit tongues on the sides of the slide K to move therein. The slide, however, may be guided by any suitable description of ways or guides.

The slide K is constructed with tongues on its sides corresponding with the grooves in the aforesaid ways and in which they move.

The end of said slide next the carriage is beveled or sloped to an angle of about 15 or 20 degrees more or less with the side of the carriage A and raised above the top of the slide and extended in length to any degree required so as to produce a bevel or guide of length suitable for the kind of stuff to be sawed against which the end of the slide strikes in jigging back the carriage for setting the log—a wheel or pulley C being placed therein for reducing friction—said bevel being again moved toward the carriage a distance equal to the thickness of the board to be cut to be in readiness for the next jigging back of the carriage in the manner to be described when another set takes place in the manner just described.

The adjustable bevel I for bringing forward the slide bevel H is attached to the slide by a hinge *i* on which it turns horizontally in setting or changing the angle of the same for sawing boards of various thickness. It has a segment arm *i i* perforated or made with a segment slot in the middle for moving over the shank of a screw *s* inserted into the slide for holding it securely in the position required. This adjustable gage bevel constitutes the main improvement and by its adjustability as aforesaid the change of the set is effected at a very small expense of time and money. An index X on the segment arm and a scale Y on the slide enable the user to adjust the apparatus very exactly for sawing the various thicknesses of boards required.

The operation of this bevel gage is as follows: As the carriage with the log advances toward the saw the latch D at the extremity of the arm *b* of the slide of the tail block comes in contact with the outside of the bevel gage I at the end which is nearest the carriage and the carriage continuing to advance and the latch being held firmly from moving laterally by the weight of the log on the slide of the tail block will, of course, cause the slide and bevels to move toward the carriage the distance required according to the thickness of board to be sawed determined by the angle at which the bevel gage I is set in which position the slide with the bevels thereon is held firmly and prevented from receding again from the carriage by means of a pawl J attached to the slide K dropping into a rack G secured to the frame F or in any convenient place. If the gage I be turned on its hinge $i$ so as to be parallel with the side of the carriage no effect would be produced on the slide carrying the bevels nor on the slide of the tail block and of course the log would not be moved. But as soon as the loose end of the bevel gage I is moved from the carriage and the gage is clamped by the screw S at the required angle with the side of the carriage and the latter moves forward then the latch D will come in contact with the gage I thus inclined and the desired result will be produced and to any degree required for sawing any thickness of boards.

The aforesaid rack is provided with teeth on its four sides at various distances apart according to the thickness of boards to be cut and is made movable so as to be turned at pleasure.

The self setting apparatus may also be applied to the head block as well as to the tail block of saw mills by a slight modification of the head block. It however, is more appropriately applied to the tail block as it is safer to set the end of the log on the head block by a lever hand and rack by hand or cams or inclined planes or other suitable fixtures than with this apparatus.

The size, proportion, and materials of the several parts of the aforesaid self setting apparatus may be varied at pleasure to suit circumstances and likewise the particular arrangement of the same may be modified in various ways to suit circumstances retaining, however, substantially the main principle by which the intended effect is produced. The adjustable gage I may be omitted and the front guide H made adjustable and adapted to setting itself forward toward the carriage as the latter advances, as well as to setting the log toward the saw in jigging back the carriage.

What I claim as my invention and which I desire to secure by Letters Patent is—

Setting the end of the log by causing the end of the slide upon which the log is dogged, as the carriage is jigged back to come in contact with an inclined guide which is again moved laterally toward the carriage the required distance for another and similar set as the carriage advances toward the saw by means of a latch or other similar appendage coming in contact with an inclined gage or adjustable bevel attached to the slide carrying the aforesaid guide in which position the said inclined guide and gage are held by a pawl attached to the said slide dropping into a rack fixed on the frame of the mill or other suitable place and this method of setting the log I claim whether it be effected by the combination of parts above set forth or any other substantially the same for producing like results.

BENJAMIN WEBB.

Witnesses:
W<small>M</small>. C<small>ROUSE</small>,
W<small>ILLIAM</small> K<small>IMM</small>.